(12) United States Patent
Vidal Alvarez et al.

(10) Patent No.: US 10,688,810 B2
(45) Date of Patent: Jun. 23, 2020

(54) ADAPTATIVE CURING

(71) Applicant: Hewlett-Packard Development Company, L.P., Houston, TX (US)

(72) Inventors: Pablo Vidal Alvarez, Sant Cugat del Valles (ES); Daniel Gutierrez Garcia, Sant Cugat del Valles (ES); Emilio Angulo Navarro, Sant Cugat del Valles (ES); Vicente Serra Jorro, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/146,158

(22) Filed: Sep. 28, 2018

(65) Prior Publication Data

US 2020/0101765 A1 Apr. 2, 2020

(51) Int. Cl.
| | | |
|---|---|---|
| *B41J 11/00* | (2006.01) | |
| *B41J 3/407* | (2006.01) | |
| *B33Y 50/02* | (2015.01) | |
| *B33Y 10/00* | (2015.01) | |

(52) U.S. Cl.
CPC ............. *B41J 11/002* (2013.01); *B41J 3/407* (2013.01); *B33Y 10/00* (2014.12); *B33Y 50/02* (2014.12)

(58) Field of Classification Search
CPC ........ B41J 11/002; B41J 3/407; B41J 3/4073; B33Y 10/00; B33Y 50/02; B41M 5/0047
See application file for complete search history.

(56) References Cited

U.S. PATENT DOCUMENTS

| | | | |
|---|---|---|---|
| 7,893,413 | B1 | 2/2011 | Appleby et al. |
| 9,343,678 | B2 | 5/2016 | Ko et al. |
| 9,487,010 | B2 | 11/2016 | Tennis et al. |
| 2016/0361873 | A1 | 12/2016 | Maier |
| 2017/0251713 | A1 | 9/2017 | Warner et al. |
| 2017/0297348 | A1 | 10/2017 | Smith |

FOREIGN PATENT DOCUMENTS

| | | |
|---|---|---|
| WO | WO-2016118704 A1 | 7/2016 |
| WO | WO-2017148540 A1 | 9/2017 |

*Primary Examiner* — Jannelle M Lebron
(74) *Attorney, Agent, or Firm* — HP Inc. Patent Department

(57) ABSTRACT

Adaptative substrate curing by ejecting a curing flow rate to a curing zone by: heating a heating fluid to a curing temperature; causing the heating fluid to flow along a plurality of serially connected chambers separated being each pair of chambers separated by a heating fluid restrictor, actuating on the heating fluid restrictor as to determine a restricted flow rate between adjacent chambers thereby defining a curing flow rate that passes from the chambers towards the curing zone.

18 Claims, 7 Drawing Sheets

ADAPTATIVE CURING

BACKGROUND

Printing systems are, in general terms, devices that modify a substrate as to incorporate an image. Printing systems may operate to spray a print fluid including pigment particles over a surface over print medium to be printed. Some print fluids may further include additional particles that can be polymerized to support the adhesion of the pigment particles to the surface.

The polymerization of the additional particles may be performed by the exposure to an external energy source. This polymerization occurs in a curing device within the printing system.

BRIEF DESCRIPTION OF THE DRAWINGS

Various example features will be apparent from the detailed description which follows, taken in conjunction with the accompanying drawings, wherein.

DETAILED DESCRIPTION

Figure 1:
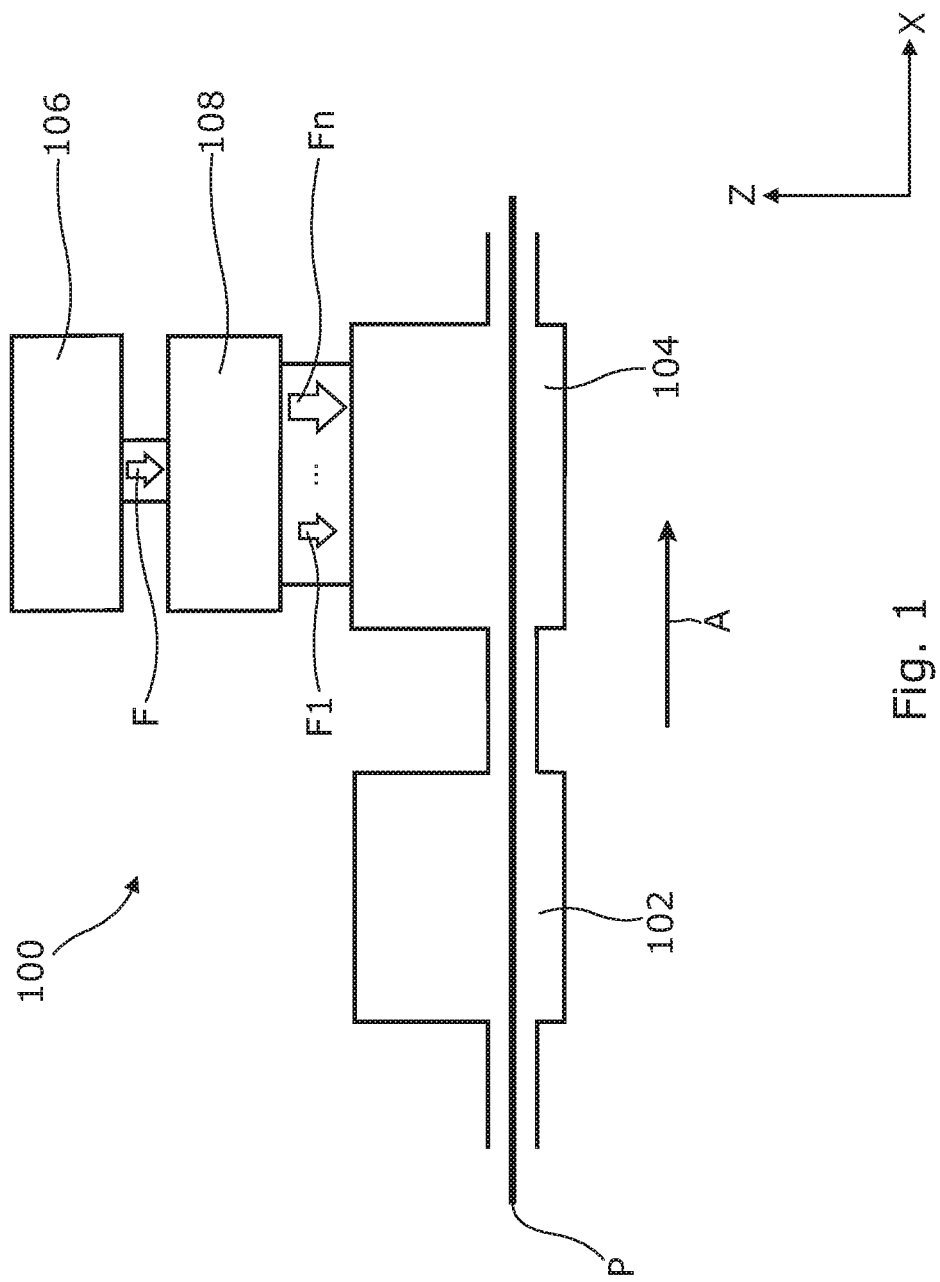
FIG. 1 is a schematic diagram of a printing system according to an example.

In order to provide for a printing system that may achieve adaptative curing capabilities, it is disclosed to a curing device, that comprises:
 a fluid flow generator to cause a heating fluid to flow towards a curing zone; and
 an impingement device arranged between the fluid flow generator and the curing zone,
wherein the impingement device comprises a plurality chambers being the chambers separated from the fluid flow generator by a heating fluid restrictor and being the heating fluid restrictor actuatable to define a curing flow rate from each chamber towards the curing zone.

In an example, the heating fluid restrictor comprise a gate movable between an open position and a closed position. Also, the gate may be, e.g., a perforated gate so that, even while in the closed position, a restricted flow of heating fluid passes between the fluid flow generator and the chambers. Therefore, one the gate associated to a first chamber is opened, a substantially unrestricted flow passes from the fluid flow generator towards a first section of the curing zone associated to the first chamber and, if the gate is closed, a restricted flow passes to such a curing zone. In an embodiment, some flow restrictors may be open, some may be closed, and/or some may be in an intermediate position so that different flow rates are achieved in the curing zone depending on the chamber associated to each section of the curing zone.

In a further example, the chambers are serially connected chambers, i.e., the heating fluid passes from one chamber to an adjacent chamber, so that while the heating fluid restrictor is to define the curing flow rate between adjacent chambers.

Moreover, the chambers may be serially connected in a media path direction. In an example, the chambers mal also be serially connected to the fluid flow generator, the fluid flow generator generates a flow towards a first chamber, the first chamber transfers the flow to an adjacent second chamber being the first and the second chamber separated by the flow restrictor. Therefore, when the flow restrictor is open, a substantially uniform curing flow flows towards the curing zone from each of the chambers and, when the restrictor is closed or partially closed a higher curing flow passes towards a first section of the curing flow associated to the first chamber and a lower curing flow passes towards a second section of the curing zone associated to the second curing chamber. In a further example, the chamber serially connected to the fluid flow generator is downstream the media path than the other chambers.

In an example, the heating fluid restrictor comprises a mechanical actuator manually actuatable by a user, e.g., a lever. In another example, the heating fluid restrictor comprises a communication link with a controller being the controller to define an operating parameter on the heating fluid restrictor, e.g. the opening of the flow restrictor. The parameter may be, e.g., an inter-chamber flow rate between a pair of adjacent chambers.

Furthermore, the impingement device may comprise a perforated plate between each chamber and the curing zone thereby achieving a uniform flow from each chamber towards the curing zone.

In an example, the fluid flow generator comprises a fan and a heater being the heating fluid air.

Also, the present disclosure refers to a printing device to eject printing fluid towards a substrate in a printing zone and a curing device comprising:
 a fluid flow generator to cause a heating fluid to flow towards a curing zone; and
 an impingement device arranged between the fluid flow generator and the curing zone,
wherein the impingement device comprises a plurality of chambers being the chambers separated from the fluid flow generator by a heating fluid restrictor and being the heating fluid restrictor actuatable to define a curing flow rate from each chamber towards the curing zone.

In an example, the printing fluid comprises a polymer component to coalesce when exposed to the heating fluid at the curing temperature.

As mentioned above, the impingement device may further comprise an actuator being the actuator coupled to the heating fluid restrictor as to determine the curing flow rate that passes from each chamber towards the curing zone.

It is further disclosed a method for achieving adaptative curing wherein the method comprises:
 heating a heating fluid to a curing temperature;
 causing the heating fluid to flow along a plurality of serially connected chambers separated being each pair of chambers separated by a heating fluid restrictor,
 actuating on the heating fluid restrictor as to determine a restricted flow rate between adjacent chambers thereby defining a curing flow rate that passes from the chambers towards a curing zone.

In an example, the heating fluid restrictor comprises a perforated gate that may be configured to change the flow rate between each chamber and a section of the curing zone associated to each chamber.

In the following description and figures, some example implementations of print apparatus, print systems, and/or printers are described. In examples described herein, a "printer" or a "printing system" may be a device to print content on a physical medium (e.g., paper, textiles, a layer of powder-based build material, etc.) with a print material (e.g., ink or toner). For example, the printer may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A printer may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

FIG. 1 shows a schematic diagram of a printing system 100 according to an example. The printing system 100 may comprise a print zone 102 and a curing zone 104. A print medium P may be moved subsequently through the print zone 102 and the curing zone 104 along a media path direction A, i.e., the advance direction A of the print medium P. Accordingly, the curing zone 104 may be arranged downstream of the print zone 102 in terms of the advance direction A.

The print zone 102 and the curing zone 104 may be implemented each in a closed volume, in a semi-closed volume, or in an open volume. The print zone 102 and the curing zone 104 may be openly connected to each other, for example, without a separating structure therebetween. Alternatively, as shown in FIG. 1, print zone 102 and the curing zone 104 may be connected via a conduit.

The printing system 100 may operate to dispose a print fluid on the surface of the print medium P within the print zone 102. The print fluid (not shown) may contain pigment particles and additional particles, such as a polymer component. Each of the pigment particles may carry a color, for example, cyan, magenta, yellow, or key (black). In the curing zone 104, the print fluid disposed on the surface of the print medium P may be processed such as to support the adhesion of the pigment particles to the surface of the print medium P.

The additional particles may support the adhesion of the pigment particles to the surface of the print medium P. For example, the additional particles in the print fluid may be polymerizable such as to form chain-like structures. For example, the additional particles in the print fluid are to coalesce under heat. For example, the additional particles may comprise latex-like or latex-based contents. Such a print fluid may be referred to as a Latex Ink. The heat used for the polymerization and/or the coalescence of the additional particles may be transferred from the heating fluid to the print medium P within the curing zone 104. In some examples, the print fluid may contain a polymer component to coalesce when exposed to the heating fluid at a curing temperature, which, for example, may be 30-200° C., or 40-150° C., or 50-100° C.

For example, either ones of the pigment particles and the additional particles of the print fluid may be encapsulated. The heat transferred from the heating fluid may penetrate other co-solvents and fluid components, such as water or water-based components, of the print fluid due to an increased flow velocity of the heating fluid towards the print fluid. The flow of the heating fluid with an increased flow velocity towards the printing medium, or the print fluid disposed thereupon, may be referred to as impingement.

In an example, when the media comprises plastics and, in particular, media is a thin-plastic media the use of a high curing flow may have a negative impact on the media and create wrinkles due, e.g., to aggressive changes in the temperature of the media when the media enters the curing zone. An adaptative curing system that allows the accommodation of aggressive temperature changes and less-aggressive temperature changes is useful in printing systems.

Therefore, the impingement may be provided to, for instance, have a lower flow of the heating fluid on the upstream side of the impingement device in terms of the heating fluid flow, and having a higher flow of heating fluid in the downstream side of the impingement device, i.e., as the media moves downstream along the advance direction A.

The printing system 100 further comprises a fluid flow generator 106 to cause the heating fluid to flow towards the curing zone 104. Accordingly, the impingement device 106 may be fluidly connected between the fluid flow generator 106 and the curing zone 104. In FIG. 1, the flow of the heating fluid is indicated by arrow F. In some examples, the heating fluid is air, in particular, ambient air.

The printing system 100 of FIG. 1 comprises an impingement device 108 arranged over the curing zone 104. The fluid flow generator 106, the impingement device 108, and the curing zone 104 may be fluidly connected to one another such as to allow the heating fluid to flow from one to another. For example, the heating fluid may flow from the fluid flow generator 106 to the curing zone 104 by passing through or penetrating the impingement device 108.

The impingement device 108 may capable of modifying a flow rate of the heating fluid towards the curing zone 104. The modification of the heating fluid flow F by the impingement device 108 may result in different flow rates of the heating fluid in different sections of the curing zone 104 along the advance direction A. The impingement device 108 may cause the print medium P to be exposed to different heating fluid flows as the print medium P advances in the advance direction A. The impingement device 108 may modify the flow rate of the heating fluid continuously, distinctly, or in a combined manner thereof.

The impingement device 108 may be disposed over the curing zone 104. In some examples, impingement device 108 may expand over at least a part of the print zone 102. The impingement device 108 may comprise heating flow restrictors that give rise to the modification of the flow rate of the heating fluid towards the curing zone 104. For example, the impingement device may comprise a gate that may be operated between an open and a closed position.

In an example that the impingement device 108 comprises a plurality of chambers, wherein at least one of the chambers is associated to the heating fluid restrictor as to vary the curing flow that flows from the at least one chamber towards the section of the curing zone associated to the at least one chamber, thereby achieving a lower curing flow in a section of the curing zone.

In some examples, the heating fluid restrictor device may comprise a gate or a wall that is impenetrable for the heating fluid. The gate or wall may comprise openings for the heating fluid to pass through. The openings formed in the gate or wall may be arranged and configured so as to cause the fluid flow of the heating fluid to vary in different areas of the impingement device 108 and/or in different areas of the curing zone 104. Additionally or alternatively, the heating fluid restrictor may comprise a movable element or functional feature to modify the position of the gate or wall thereby changing the flow rate of the heating fluid towards the curing zone 104 from at least one of the chambers.

In some examples, the impingement device 108 may divide up the heating fluid flow F into a plurality of partial flows F1 to Fn of the heating fluid as illustrated in FIG. 1. In this example, the partial flows F1 to Fn of the heating fluid are numbered along the advance direction A from a first partial flow F1 to a final partial flow Fn. The number n of the partial flows F1 to Fn may vary between two and several flows, e.g., five.

The partial flows F1 to Fn may differ from one another in a flow rate of the heating fluid towards the curing zone 104. For example, the partial flows F1 to Fn may differ in total flow rate, or flow rate density. The difference in the flow rate between the partial flows F1 to Fn may be continuous or distinct. The flow rate may refer to a volume flow of the heating fluid per time unit, e.g. sccm or liter per second. The total flow rate may refer to the flow rate summed over a given area, e.g. over a defined portion of a perforated plate of the impingement device. The flow rate density may refer to the flow rate per unit area, e.g. sccm per $mm^2$ or liter per second and per $mm^2$. For example, the flow rate density may represent the division of the total flow rate by the corresponding area.

The partial flows F1 to Fn may cover a respective area of the impingement device 108 and/or of the curing zone 104. The areas covered by the partial flows F1 to Fn may be adjacent or separated from one another. In some examples, each of the areas covered by the partial flows F1 to Fn extends over the entire width of the curing zone 104 and/or the impingement device 108, i.e., the transversal direction perpendicular to the media advance direction A. The areas covered by the partial flows F1 to Fn may differ from one another in position and/or extent in the advance direction A. The area coverage of the individual partial flows F1 to Fn may vary. One of the partial flows F1 to Fn may extend over a first section of the curing zone 104, and another one of the partial flows F1 to Fn may extend over a second section of the curing zone 104. In an example, the second area is larger than the first area.

Each of the partial flows F1 to Fn may have a respective total flow rate and a respective flow rate density. The total flow rate and the flow rate densities of at least two of the partial flows F1 to Fn may vary. Accordingly, the impingement device 108 may cause the flow rate density of the heating fluid to vary along the advance direction A.

Figure 2:
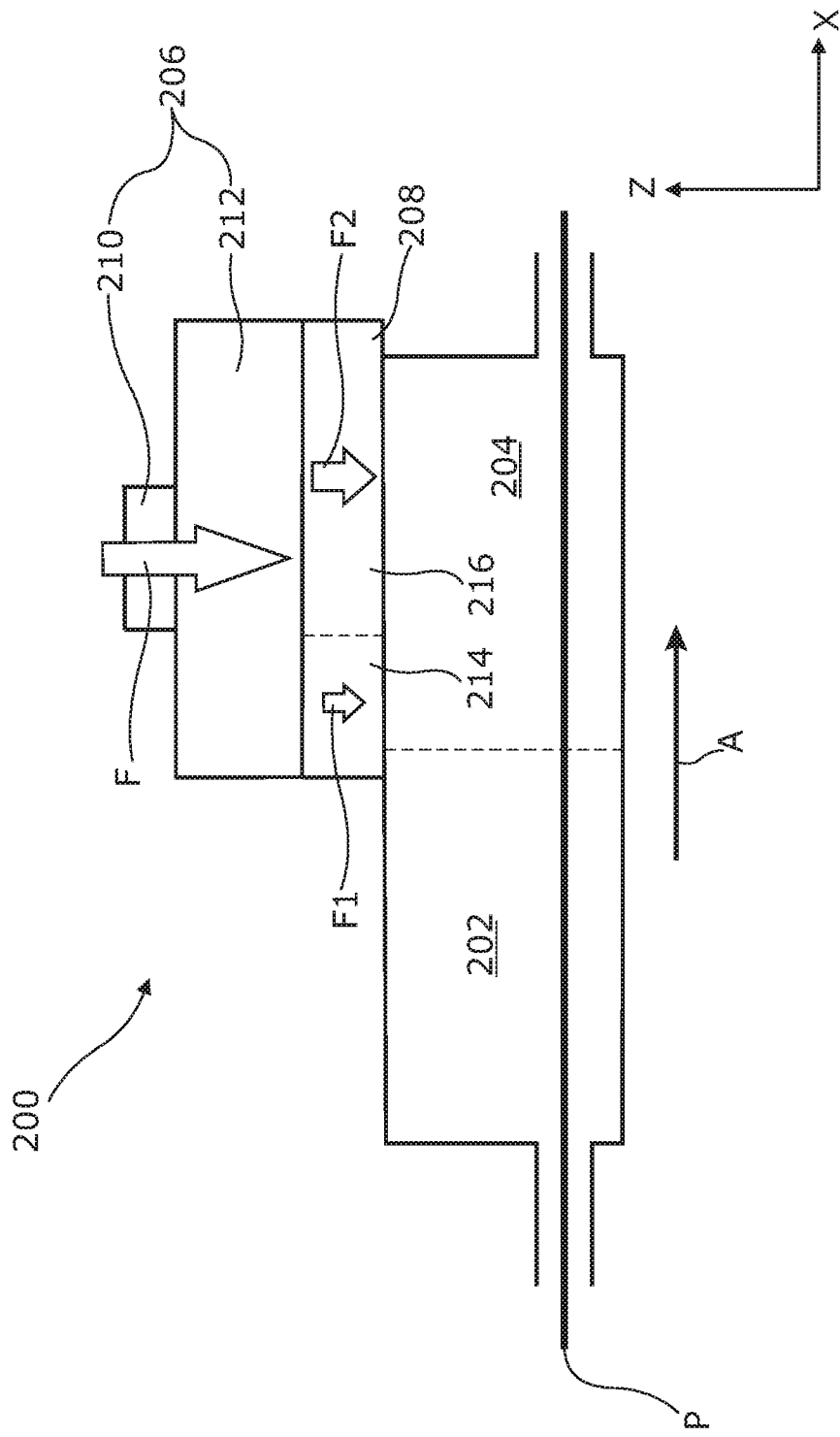
FIG. 2 is a schematic diagram of a printing system according to an example.

FIG. 2 shows a schematic diagram of a printing system 200 according to an example. Unless otherwise indicated in the following, a printing system 200 may comprise at least some of the structural and functional features of the printing system 100 and its elements described above with reference to FIG. 1.

The printing system 200 may comprise a printing zone 202 and a curing zone 204. A print medium P may be moved subsequently through the print zone 202 and the curing zone 204 along the advanced direction A of the print medium P. Accordingly, the curing zone 204 may be arranged downstream of the print zone 202 in terms of the advance direction A.

The print zone 202 and the curing zone 204 may be implemented each in a closed volume, in a semi-closed volume, or in an open volume. The print zone 202 and the curing zone 204 may be openly connected to each other, for example, without a separating structure therebetween, as shown in FIG. 2. Alternatively, print zone 202 and the curing zone 204 may be connected via a conduit or separated by a wall.

The printing system 200 may operate to dispose a print fluid on the surface of a print medium P within the print zone 202. The print fluid may contain pigment particles and additional particles as described above. In the curing zone 204, the print fluid disposed on the surface of the print medium P may be processed such as to induce coalescence of the additional particles, thereby supporting the adhesion of the pigment particles to the surface of the print medium P.

The curing device comprises a fluid flow generator 206 and an impingement device 208, each having features similar or identical to those of the printing system 100 described above. Accordingly, the fluid flow generator 206 may be suitable for generating a heating fluid flow F towards the curing zone 204. For this purpose, the fluid flow generator 206 may comprise a fan 210 to create a curing flow, i.e., a set of partial flow F1 to Fn towards the curing zone 204. The fluid flow generator 206 may comprise an alternative or additional means or device, such as a pump, compressor, or blower, to generate the heating fluid flow F.

Additionally or alternatively, the fluid flow generator 206 may comprise an intermediate chamber 212 to receive the heating fluid. The intermediate chamber 212 may provide a volume in which the heating fluid is to be processed in a manner suitable for the impingement device 208 to modify the flow rate of the heating fluid. For example, the heating fluid may be heated up to a desired temperature in the chamber 212 using a heating device (not shown in FIG. 2). For example, the heating fluid may be compressed to a desired pressure in the chamber 212 using the fan 210 or any other proper means. Furthermore, a combination of heating and compression of the heating fluid may be performed in the chamber 212. In further examples, the chamber 212 may provide space for otherwise processing the heating fluid, such as acceleration or deceleration, channeling, swirling, depressurizing, or cooling. Additionally or alternatively, the chamber 212 may serve as a conduit for the heating fluid or for a temporary containment.

The printing system 200 further comprises an impingement device 208 arranged upstream of the curing zone 204 in terms of the heating fluid flow F. The impingement device 208 may be arranged downstream of the fluid flow generator 206 in terms of the heating fluid flow F. The fluid flow generator 206, the impingement device 208, and the curing zone 204 may be fluidly connected to one another such as to allow the heating fluid to flow from one to another. For example, the heating fluid may flow from the fluid flow generator 206 to the curing zone 204 by passing through or penetrating the impingement device 208.

The impingement device 208 may comprise a first chamber 214 and a second chamber 216. The first chamber 214 is located upstream of the second portion 216 in terms of the advance direction A of the print medium P. The first and second chambers 214, 216 are adjacent and both arranged over the curing zone 204. Either of the first and second portions 214, 216 may extend over the entire width of the impingement device 208, wherein the width may refer to a direction perpendicular to the advance direction A. Furthermore, the width may parallel to the surface of the print medium P when located in the curing zone 204. The areas of the first and second chambers 214, 216 may be different. In particular, the first and second chambers 214, 216 may differ in the extension in the advance direction A. In the example shown in FIG. 2, the first chamber 214 may have a smaller extent in the advance direction A than the second chamber 216. In this example, the first chamber 214 may cover a smaller area of the impingement device 208, and/or of the curing zone 204, than the second chamber 216.

The impingement device 208 may divide up the heating fluid flow F into a plurality of curing flows F1 to Fn being each of the curing flows associated to a chamber 214, 216, as described above being the curing flow the flow to be applied on the curing zone. In the example shown in FIG. 2, the first chamber 214 of the impingement device 208 may be associated to a first partial flow F1 and the second chamber 216 may be associated to a second partial flow F2 upon receiving the heating fluid flow F.

In an example, the impingement device 208 comprises a flow restrictor that receives a heating fluid flow F and may allow a first partial flow F1 to pass towards the first chamber 214 and allow a second partial flow F2 to pass towards the second chamber 216. In a further example, the first partial flow is lower than the second partial flow.

The flow restrictor may comprise an actuator moveable between an open position and a closed position being the open position to allow substantially without restriction the heating flow F to pass towards the chambers 214, 216 whereas in a position other than the open position, a flow lower than the heating flow may pass towards the chambers 214, 216.

Figure 3A:
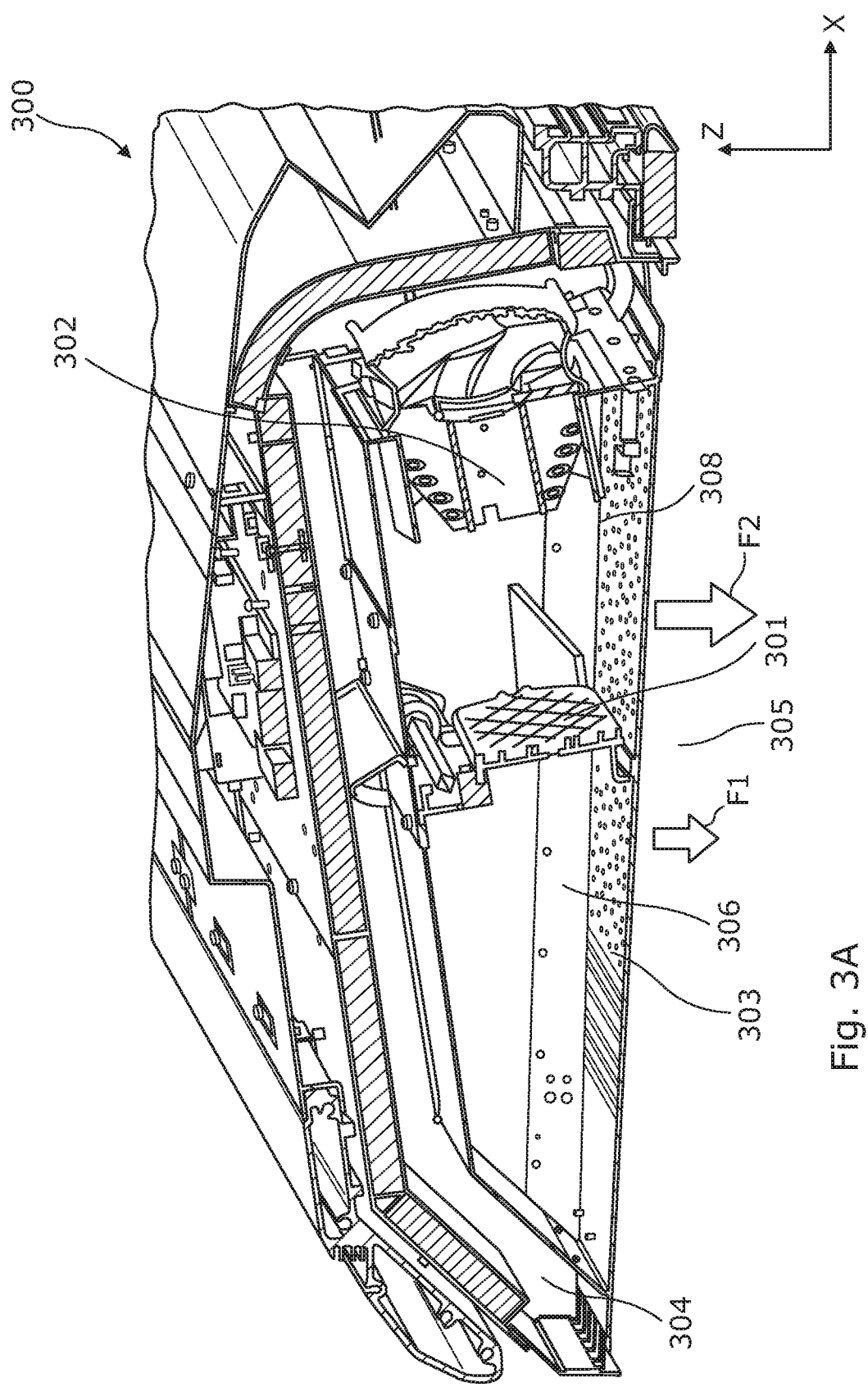
FIGS. 3A and 3B show longitudinal sections of an example of a curing device according to an example in two different curing configurations.
Figure 3B:
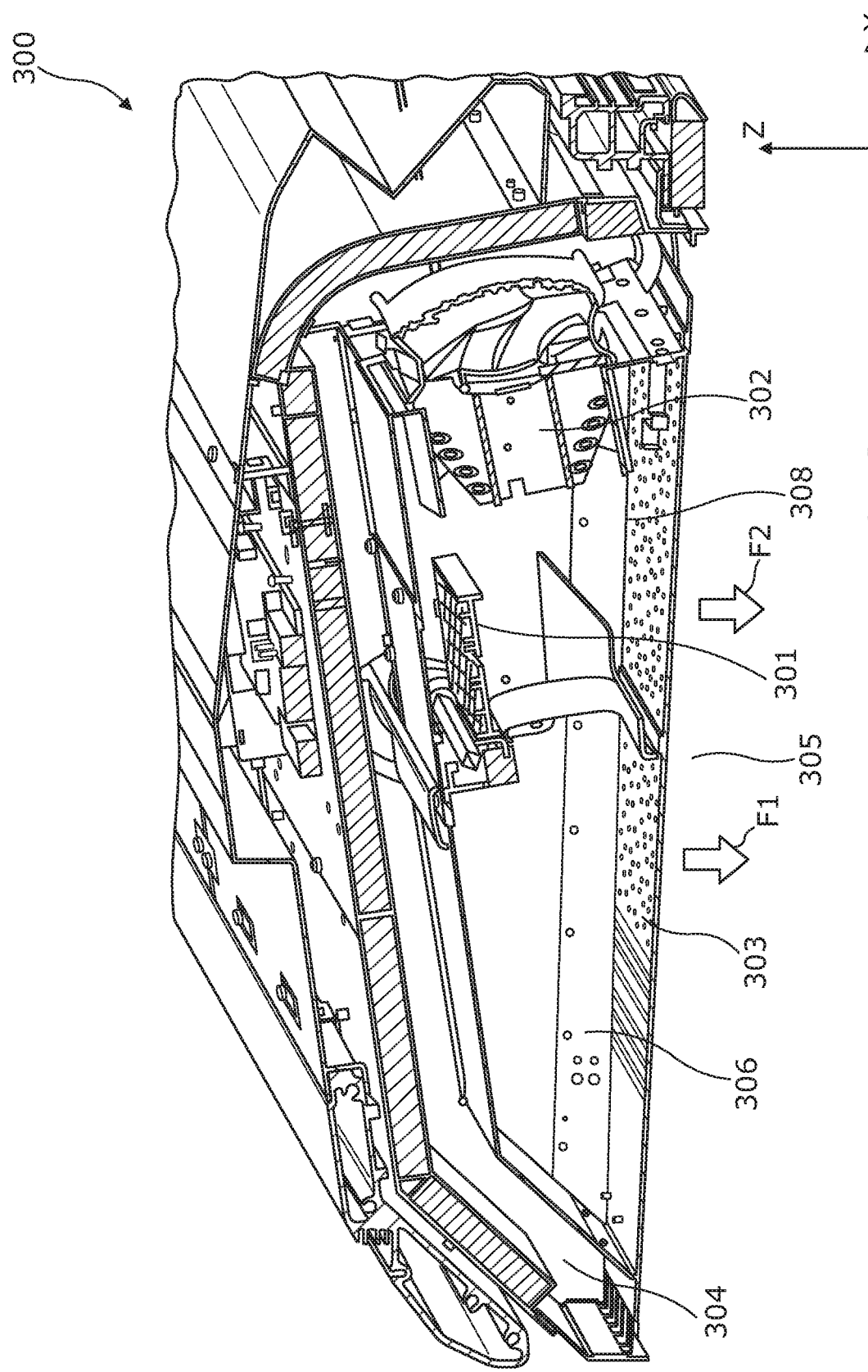

FIGS. 3A and 3B show a longitudinal section of a curing device according to an example. It should be understood that throughout the present disclosure, the longitudinal direction is a direction parallel to the media advance direction A, i.e., the X axis of the figures, in consequence, the transversal direction corresponds to the Y axis of the figures that may also be described as the width of the curing device and/or printing system.

Referring to FIG. 3A, the curing device 300 comprises a heating fluid flow generator 302 that comprises a fan and a heater. The heating fluid flow generator 302 is to generate a flow towards the impingement device 307, in particular, towards a second chamber 308.

In the example of FIG. 3A, the impingement device comprises a first chamber 306 located upstream to the second chamber 308 being the first chamber connected in series to the second chamber and comprising a flow restrictor 301 that separates the first chamber 306 from the second chamber 308.

As shown in FIG. 3A, if the flow restrictor is in the closed position, a higher flow rate of heating fluid may pass through the second chamber 308 towards the curing zone 305 when compared to the flow rate of heating fluid that passes from the first chamber 306 to the curing zone 305. Therefore, the curing zone may have a first section associated to the first chamber 306 wherein the flow of heating fluid is lower, and a second section associated to the second chamber 308 wherein the flow of heating fluid is higher.

In an example, the flow restrictor does not completely prevent heating fluid to pass form the second camber 308 towards the first chamber, instead, it restricts the flow so that some heating fluid may pass from the second chamber to the first chamber even when the restrictor is in the closed position, i.e., there will be a first flow rate F1 and a second flow rate F2 wherein the first flow rate is not zero. This configuration may be particularly useful while curing substrates that contain plastics and, in particular, thin-plastic substrates wherein aggressive temperature changes may create wrinkles on the substrate.

In an example, the nominal flow rates when the flow restrictor is in the closed position (as shown in FIG. 3A) may be:

F1=25 m$^3$/hour to 45 m$^3$/hour
F2=45 m$^3$/hour to 75 m$^3$/hour.

Turning now to FIG. 3B, the flow restrictor 301 is in the open position. In this case, the flow restrictor has no substantial effect in reducing the flow that passes from the second chamber 308 towards the first chamber 306. Therefore, the first flow rate F1 should be substantially equal to the second flow rate F2, thereby achieving a uniform curing flow rate along the curing zone 305.

In an example, the nominal flow rates when the flow restrictor is in the open position (as shown in FIG. 3A) may be:

F1=F2=130 m$^3$/hour to 215 m$^3$/hour

In a further example, the flow restrictor 301 can be positioned between the open and the closed position to set the partial flow rates F1, F2 accordingly. The flow restrictor 301 may comprise an actuator to move it between the open and the closed position and such actuator may be manual such as, e.g., a lever or may be remotely controlled, e.g., electrically-driven. In the case of a remotely controlled actuator, it may comprise a communication link to a controller (not shown).

Furthermore, the curing device 300 may comprise a recirculation channel 304 that allows part of the partial flow rates F1, F2 to be recirculated through the channel and be guided towards the flow generator 302 for its reuse.

Figure 4:
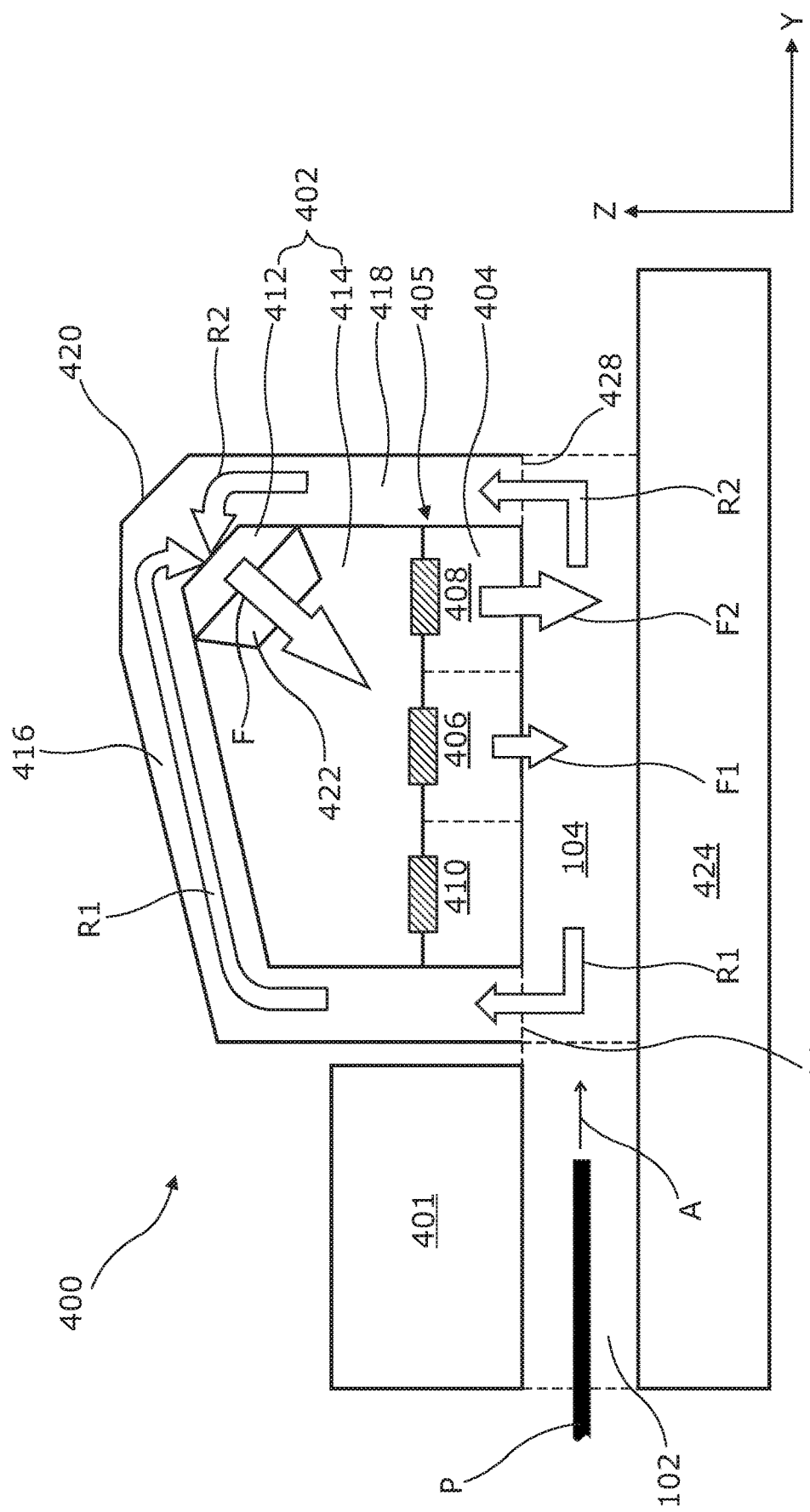
FIG. 4 is a schematic diagram of a printing system according to an example.

FIG. 4 shows a schematic diagram of a printing system 400 according to an example. The printing system 400 comprises a curing device that, in turn, comprises a fluid flow generator 402 and an impingement device 404. As shown in FIG. 4, the printing system 400 comprises, or is disposed over, a print zone 102 and a curing zone 104. The functional and structural features of any of the printing system 400, and the curing device may correspond to the above description with any of the printing systems 100, 200, 300 and the impingement device 208, 307 with reference to FIGS. 1 to 3, unless otherwise indicated.

In some examples, the printing system 400 comprises a print fluid disposal device 401. The print fluid disposal device 401 may include, for example, print heads mounted on a carriage movable along a direction perpendicular to an advance direction A of a print medium P. The print fluid disposal device 401 may operate to dispose print fluid on the surface of the print medium P according to an image to be printed. The print fluid may comprise pigment particles and additional particles as described above.

The fluid flow generator 402 may cause a heating fluid, e.g. air, to flow towards the curing zone 104 arranged downstream of the print zone 102 in terms of an advance direction A of a print medium P. The fluid flow generator 402 may create a heating fluid flow F as shown in FIG. 4. The impingement device 404 may be arranged between the fluid flow generator 402 and the curing zone 104. The impingement device 404 may comprise at least a fluid restrictor 41, 42, 43 to modify a flow rate of the heating fluid towards the curing zone 104 along the advance direction A in the above-described manner.

The impingement device 404 may comprise plates 405 that define a first chamber 410 a second chamber 406 and a third chamber 408. The first, second and third chambers 410, 406, 408 may be associated to a first, second and third heating fluid restrictors 41, 42, 43 respectively, i.e., each chamber may be associated to a heating fluid restrictor.

The fluid flow generator 402 may comprise a fan 412 and a chamber 414. The fluid flow generator 402 as well as its fan 412 and chamber 414 may comprise the functional and structural features as described above with reference to FIG. 2. The fan 412 may operate to blow the heating fluid towards the curing zone 104. For example, the fan 412 may operate to intake the heating fluid from a front fluid conduit 416 and a rear fluid conduit 418, which are formed along outer walls of the perforated plate 405 and the chamber 414 and enclosed by a housing 420. The fan 412 may operate to blow the heating fluid into the intermediate chamber 414, thereby increasing the pressure of the heating fluid therein.

Furthermore, the printing system 400 may comprise a heating device 422 to heat the heating fluid upstream of the curing zone 104 in terms of the heating fluid flow F. The heating device 422 may heat the heating fluid to, or above, a curing temperature. For example, the curing temperature is 30-200° C., or 40-150° C., or 50-100° C. In some examples, the heating device 422 may comprise a coil heater to heat the heating fluid while passing through. For example, the coil heater may have a hollow portion through which the heating fluid may pass.

In the example provided in FIG. 4, the first flow restrictor 41 may be closed and have no perforations or passages thereby preventing the heating fluid flow F to pass towards the first chamber 410. The second flow restrictor 42 may be closed and have perforations that allow a certain amount of fluid to pass through, therefor a restricted flow rate may pass through the second flow restrictor 42 towards the second chamber 406. The third flow restrictor 43 may be in the open position, thereby allowing a high flow rate to pass through the third restrictor 43 towards the third chamber 408.

Therefore, the impingement of the heating fluid towards the curing zone 104, or towards the print medium P if located therein, is zero in the section of the curing zone 104 below the first chamber 410, have a lower flow rate in the section of the curing zone 104 associated to the second chamber 406 and have a higher flow rate in the section of the curing zone 104 associated to the third chamber 408. In this example, the active curing area 104 is shortened by the closure of the first chamber 410 and an increasing temperature profile is achieved by having a lower flow rate in the second chamber 406 and the high flow of the third chamber 408 performs a high-energy transfer that activates the curing of the print fluid. This curing profile may be especially useful when the print medium P comprises plastics or is a thin-plastic substrate that is known to be sensitive to aggressive temperature changes.

Depending on the operation of the flow restrictors 41, 42, 43, different curing profiles may be achieved, therefore, an adaptative curing is provided.

In a further example, all of the flow restrictors 41, 42, 43 may be open, thereby achieving a substantially uniform heating fluid flow across the curing zone, which may be useful, e.g., when the print medium P is a cellulosic substrate.

The print medium P, or the print fluid disposed thereupon, may be exposed to different intensities of heating fluid impingement when advancing through the curing zone 104 in the advance direction A. Parameters including the aperture of the restrictors 41, 42, 43, may be chosen according to individual printing tasks. For example, the individual printing tasks may relate to the individual images to be printed. For example, the individual printing tasks may relate to different print media in terms of the material, surface properties, size, thickness or rigidity.

The printing system 400 may further comprise a platen 424 to support the print medium P within the curing zone 104. The platen 424 may further support the print medium P within the print zone 102. The platen 424 may support the print medium P so as to provide an even surface to be printed on.

A part of the heating fluid in the curing zone 104 may further flow opposite to the advance direction A towards the front fluid conduit 416, as indicated by arrow R1. A part of the heating fluid in the curing zone 104 may further flow in the advance direction A towards the rear fluid conduit 418, as indicated by arrow R2. For example, the fluid flow generator 402, or the fan 412, may cause the heating fluid to flow towards a front intake 426 or a rear intake 428 fluidly connected to the front fluid conduit 416 and the rear fluid conduit 418, respectively. A part of the heating fluid may be intaken at the front intake 426 and conducted into the front fluid conduit 416. A part of the heating fluid may be intaken at the rear intake 428 and conducted into the rear fluid conduit 418. The intaken heating fluid may be conducted by and towards the fluid flow generator 402, or the fan 412, and re-heated by the heating device 422. Accordingly, the heating fluid may be partially re-harvested and repeatedly used for impingement. The power consumption of the printing system 400 may be reduced in this manner.

With reference to FIG. 4, the printing system 400 may have printhead, in which the print fluid is disposed on the print medium P. For example, the printing system may comprise the print fluid disposal device 401. The print fluid may comprise a polymer component to coalesce when exposed to the heating fluid at the curing temperature. The heating fluid may be heated to the curing temperature or above by the heating device 422 as described above.

The printing system 400 may comprise a curing device in which the print medium P is exposed to the heating fluid flow at the curing temperature. The curing device may encompass, or be included by, the curing zone 104. The heating fluid flow may be generated by the fluid flow generator 402 as described above. The curing device may comprise the impingement device 404 to modify a flow rate of the heating fluid towards the print medium P along the advance direction A. The modification of the flow rate of the heating fluid may relate to modifying the total flow rate, the flow rate density, or the combination thereof.

The printing system 400 may comprise a conveyor to move the print medium P from the print zone 102 to the curing zone 104. For example, the conveyor may to transport the print medium in the advance direction A. The conveyor may involve belts, rollers, chains, or the like, or the combination thereof, to transport the print medium P in the advance direction A.

Figure 5A:
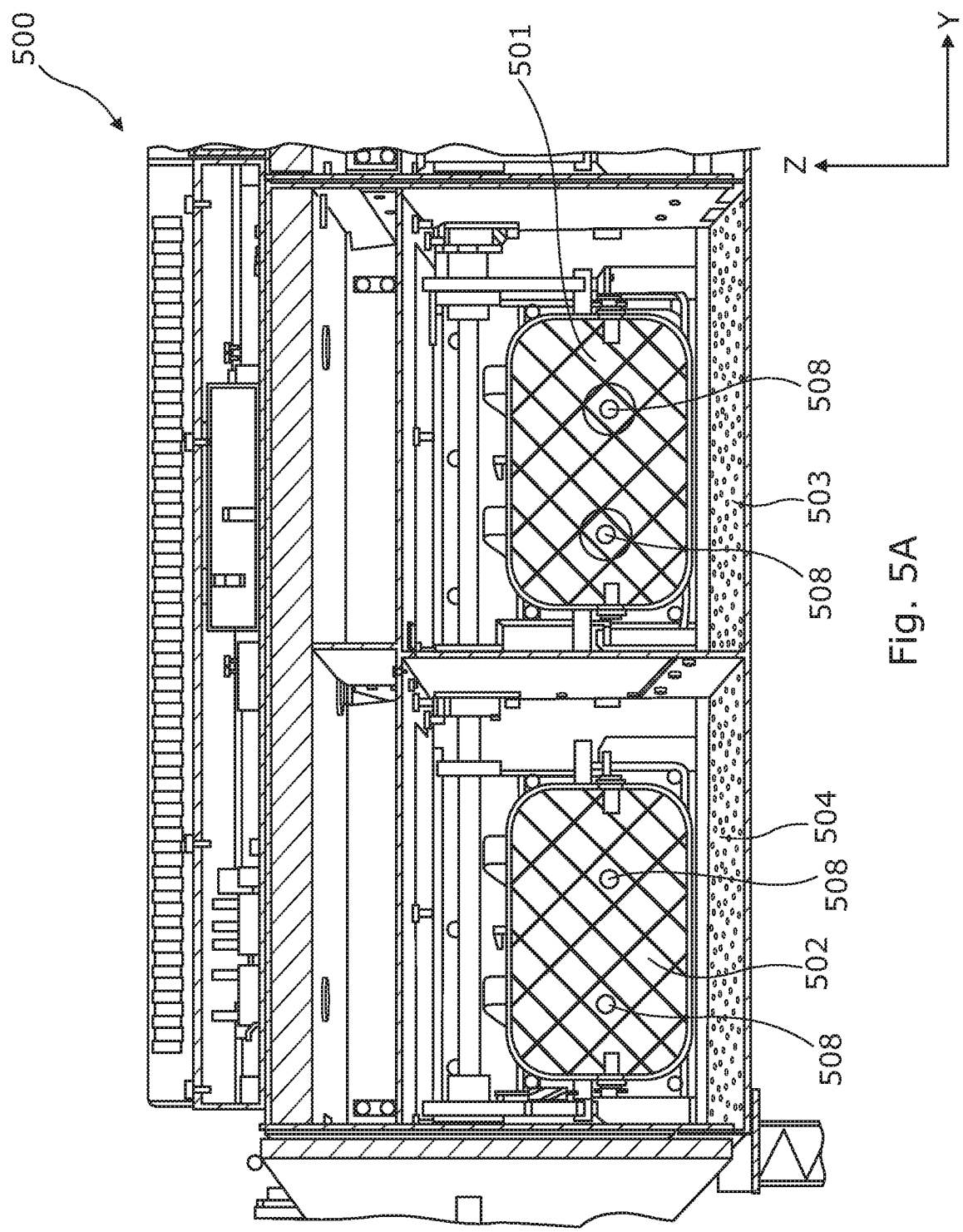
FIGS. 5A and 5B show transversal sections of an example of an impinging device according to an example in two different curing configurations.
Figure 5B:
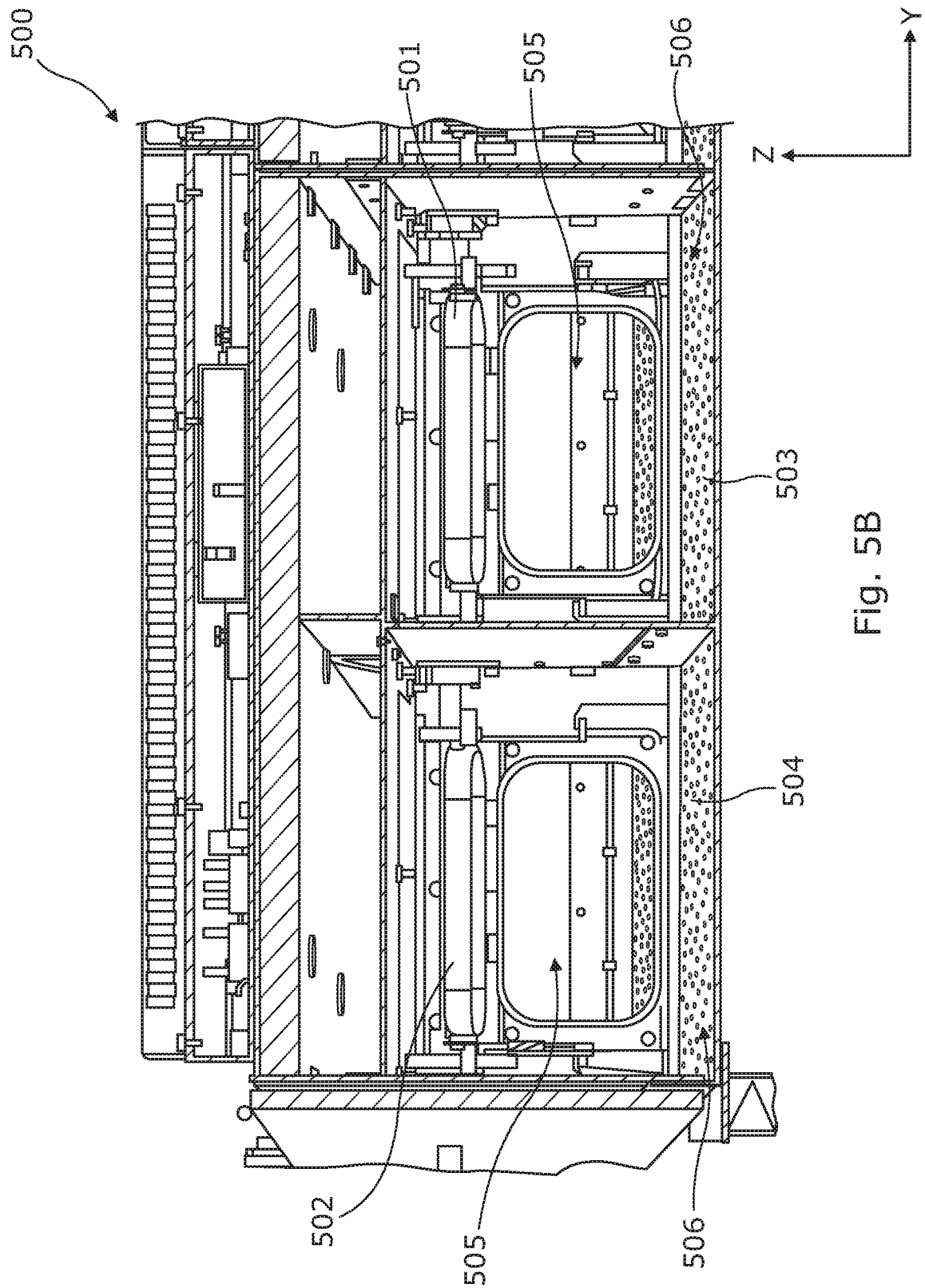

FIGS. 5A and 5B show a transversal section of an example of an impinging device 500 according to an example. In the example of FIGS. 5A and 5B a fluid flow generator is to generate a flow of heating fluid along a heating fluid direction is orthogonal to axis Y and Z of the figures, i.e., towards the flow restrictors 501, 502 in FIG. 5A.

In the example of FIGS. 5A and 5B the impingement device comprises several modules adjacent in a transversal direction wherein each of the modules comprises a flow restrictor 501, 502, a fluid flow generator (not shown), a plurality of serially connected chambers 505, 506 and a perforated plate 503, 504 that fluidly communicates the chambers 505, 506 with the curing zone 507.

In an example, the flow restrictor communicates the first chamber 505 with the second chamber 506 and its position defines the amount of flow that the first chamber 505 receives from the fluid flow generator.

FIG. 5A shows a curing configuration wherein the flow restrictor 501, 502 is closed and comprises a set of perforations 508. In this configuration the restrictor 501, 502 would prevent some of the flow provided by the fluid flow generator to pass towards the first chamber, therefore, a restricted flow rate would pass to the first chamber and flow towards the curing zone 507. Further, a flow rate higher than the flow rate that flow from the first chamber would flow from the second chamber 506 towards the curing zone.

FIG. 5B shows a further curing configuration wherein the flow restrictor 501, 502 is open thereby allowing a substantially unrestricted flow between the second chamber 506 and the first chamber 505. In consequence, a substantially equal flow would flow the from first chamber 505 towards the curing zone 507 and from the second chamber 506 towards the curing zone 507, thereby achieving a uniform flow across the entire curing zone 507.

In an example, the flow restrictors 501, 502 associated to transversally adjacent chambers are mechanically coupled as to move jointly between the open position and the closed position. Furthermore, the flow restrictors may be operated manually, e.g., by means of a lever or similar mechanism or may comprise an actuator with a communication link to a controller being the actuator coupled to the flow restrictors as to define the position of the flow restrictors 501, 502. The position of the flow restrictors may be fully open, fully closed or intermediate positions between the fully open and fully closed positions depending on the amount of flow to be configured by a user.

As shown in the examples of FIGS. 5A and 5B, the flow restrictors 501, 502 may comprise gates which may have perforations wherein the number and size of such perforations help determine the amount of flow that passes between the second chamber 506 and the first chamber 505 and, in consequence, defining the curing flow of the section of the curing zone 507 associated to each of the chambers 505, 506.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teachings. It is to be understood that any feature described in relation to any one example may be used alone, or in combination with other features described, and may also be used in combination with any features of any other of the examples, or any combination of any other of the examples.

The invention claimed is:

1. A curing device comprising:
a fluid flow generator to cause a heating fluid to flow towards a curing zone divisible into first and second curing sub-zones in each of which curing occurs via the heating fluid; and
an impingement device arranged between the fluid flow generator and the curing zone,
wherein the impingement device comprises:
first and second chambers respectively corresponding to the first and second curing sub-zones;
a heating fluid restrictor that is actuatable between an open position and a closed position,
and wherein in the closed position the heating fluid restrictor restricts heating fluid flow at the second curing sub-zone, causing the heating fluid to have a lower flow rate at the second curing sub-zone in which the curing occurs than at the first curing sub-zone at which the curing occurs.

2. The curing device of claim 1, wherein the heating fluid restrictor comprises a gate movable between the open position and the closed position.

3. The curing device of claim 2, wherein the gate is a perforated gate so that, in the closed position, the heating fluid flow at the second curing sub-zone is restricted.

4. The curing device of claim 1, wherein the first and second chambers are serially connected chambers separated by the heating fluid restrictor.

5. The curing device of claim 4 wherein the first and second chambers are serially connected in a media path direction.

6. The curing device of claim 1, wherein the heating fluid restrictor comprises a mechanical actuator manually actuatable by a user.

7. The curing device of claim 1, wherein the heating fluid restrictor comprises a communication link with a controller that is to define an operating parameter on the heating fluid restrictor.

8. The curing device of claim 7, wherein the parameter is an inter-chamber flow rate between the first and second chambers.

9. The curing device of claim 1, wherein the impingement device comprises a perforated plate between each of the first and second chambers and the curing zone.

10. The curing device of claim 1 wherein the fluid flow generator comprises a fan and a heater.

11. The curing device of claim 1, wherein in the open position the heating fluid restrictor does not restrict the heating fluid flow at the second curing sub-zone, causing the heating fluid to have a same flow rate at the second curing sub-zone in which the curing occurs as at the first curing sub-zone at which the curing occurs.

12. A printing system comprising a printing device to eject printing fluid towards a substrate in a printing zone and a curing device comprising:
a fluid flow generator to cause a heating fluid to flow towards a curing zone divisible into first and second curing sub-zones in each of which curing of the printing fluid ejected on the substrate occurs via the heating fluid; and
an impingement device arranged between the fluid flow generator and the curing zone,
wherein the impingement device comprises:
first and second chambers respectively corresponding to the first and second curing sub-zones;
a heating fluid restrictor that is actuatable between an open position and a closed position,
and wherein in the closed position the heating fluid restrictor restricts heating fluid flow at the second curing sub-zone, causing the heating fluid to have a lower flow rate at the second curing sub-zone in which the curing occurs than at the first curing sub-zone at which the curing occur.

13. The printing device of claim 12, wherein the printing fluid comprises a polymer component to coalesce when exposed to the heating fluid at a curing temperature.

14. The printing device of claim 12, further comprising an actuator coupled to the heating fluid restrictor to control the curing flow rate at the first and second curing sub-zones in which the curing occurs.

15. The printing system of claim 12, wherein in the open position the heating fluid restrictor does not restrict the heating fluid flow at the second curing sub-zone, causing the heating fluid to have a same flow rate at the second curing sub-zone in which the curing occurs as at the first curing sub-zone at which the curing occurs.

16. A method comprising
heating a heating fluid to a curing temperature;
causing the heating fluid to flow between serially connected first and second chambers separated by a heating fluid restrictor, the first and second chambers corresponding to first and second curing sub-zones of a curing zone and in each of which curing occurs via the heating fluid; and
actuating the heating fluid restrictor to a closed position in which the heated fluid restrictor restricts heating fluid flow at the second curing sub-zone, causing the heating fluid to have a lower flow rate at the second curing sub-zone in which the curing occurs than at the first curing sub-zone at which the curing occurs.

17. The method of claim 16, wherein the heating fluid restrictor comprises a perforated gate.

18. The method of claim 16, further comprising:
actuating the heated fluid restrictor to the open position in which the heating fluid restrictor does not restrict the heating fluid flow at the second curing sub-zone, causing the heating fluid to have a same flow rate at the second curing sub-zone in which the curing occurs as at the first curing sub-zone at which the curing occurs.

* * * * *